Aug. 15, 1939. F. PORSCHE 2,169,373
VEHICLE SUSPENSION
Original Filed Jan. 25, 1932 2 Sheets-Sheet 1
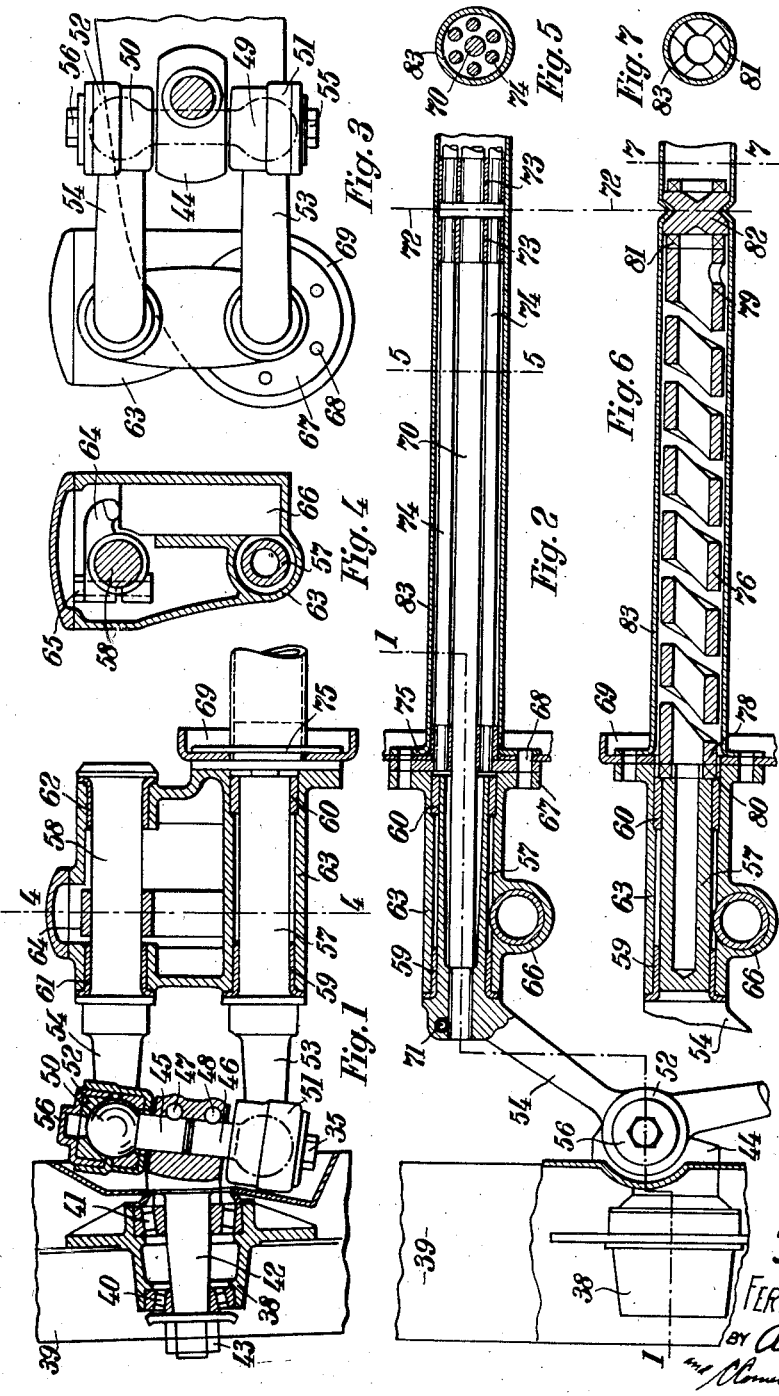
Inventor:
FERDINAND PORSCHE
ATTORNEYS Aug. 15, 1939  F. PORSCHE  2,169,373
VEHICLE SUSPENSION
Original Filed Jan. 25, 1932  2 Sheets-Sheet 2
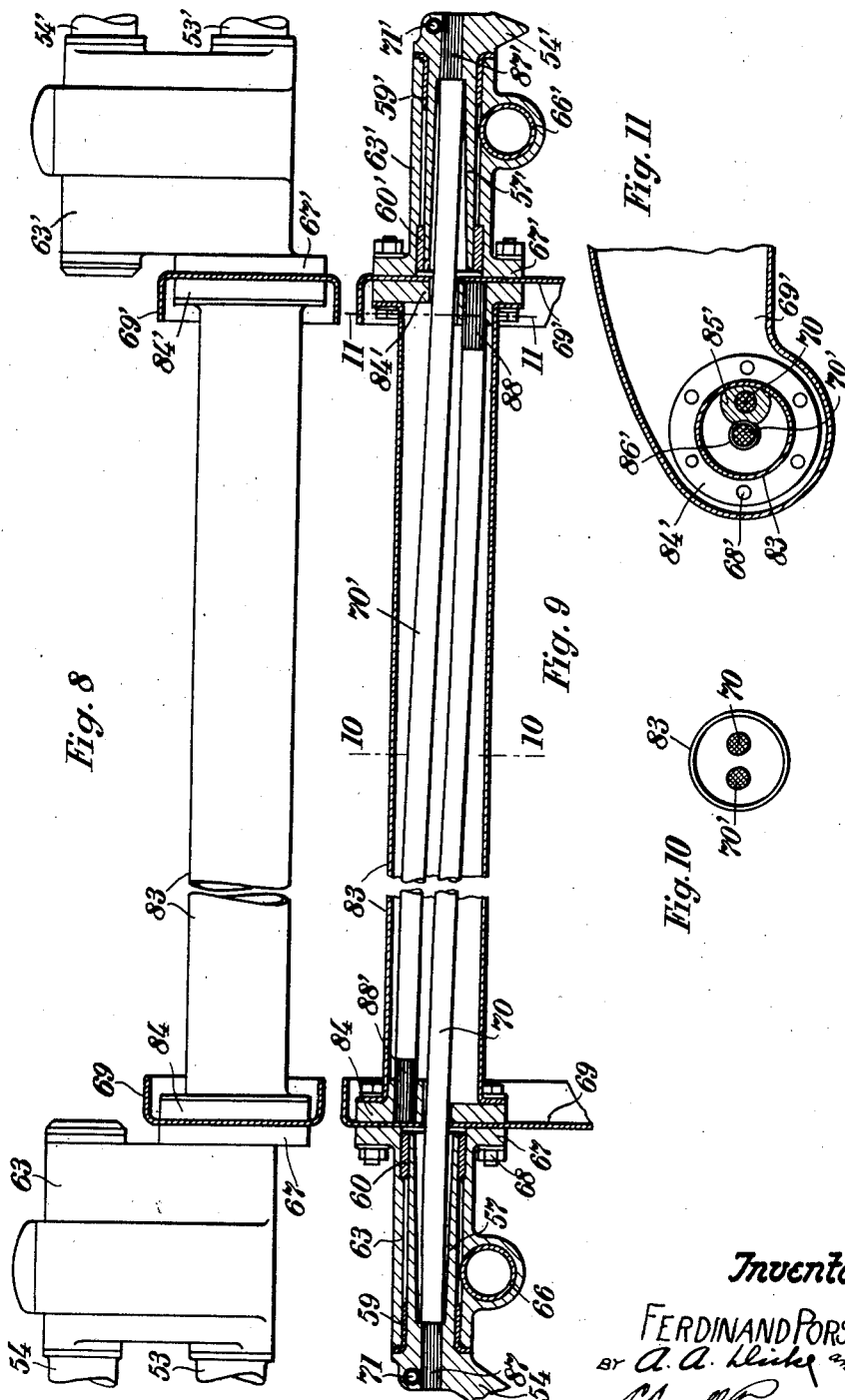

Patented Aug. 15, 1939

2,169,373

UNITED STATES PATENT OFFICE

2,169,373

VEHICLE SUSPENSION

Ferdinand Porsche, Stuttgart, Germany, assignor to Dr. Ing. h. c. F. Porsche, K.-G., Stuttgart-Zuffenhausen, Germany, a company of Germany Original application January 25, 1932, Serial No. 588,719. Divided and this application October 21, 1937, Serial No. 170,183. In Germany August 10, 1931

17 Claims. (Cl. 267—57)

This invention relates to vehicle suspension and particularly to the suspension of the wheels or ground engaging means of a vehicle, and more particularly contemplates the use of rotary spring means for the resilient supporting of such wheels or ground engaging means. This present application is a division of my copending application Serial No. 588,719 filed January 25, 1932, now Patent No. 2,099,012 issued November 16, 1937.

An object of my invention is the provision of improved means for resiliently supporting the wheels or ground engaging means of a vehicle.

Another object of my invention is the provision of improved means for springing and rigidly supporting the wheels of a vehicle relative to the vehicle frame.

A further object of my invention is the improved springing and supporting of vehicle wheels in which the wheels are rigidly guided relative to the frame and at the same time may be readily controlled for steering movement.

A still further object of my invention is the provision of wheel springing means for a vehicle which will, for the most part, be enclosed within hollow frame members forming part of the vehicle frame.

Another object of this invention is the provision of improved combined shock absorbing and spring means for vehicle wheels.

A more specific object of this invention is an improved arrangement for the torsional independent suspension of vehicle wheels.

Other and additional objects and advantages of the present invention, together with desirable details of construction and improved combinations of parts, will be hereinafter described and particularly pointed out in the claims.

In the drawings which accompany and form part of this specification:

Fig. 1 is a partial transverse section of the wheel suspension in accordance with this invention, taken along the line 1—1 of Fig. 2;

Fig. 2 is a plan view partially in cross section showing the combination of the wheel suspension means with a form of the spring construction used;

Fig. 3 is a side view of part of the suspension means illustrated in Fig. 1;

Fig. 4 is a longitudinal section taken along the line 4—4 of Fig. 1;

Fig. 5 is a cross-section taken along the line 5—5 of Fig. 2;

Fig. 6 is a sectional view similar to Fig. 2 illustrating a modified form of spring suspension;

Fig. 7 is a cross-section taken along the line 7—7 of Fig. 6;

Fig. 8 is a transverse view of a suspension embodying the constructions illustrated in Figs. 9-11 inclusive, looking toward the front of the vehicle;

Fig. 9 is a transverse view partially in cross section of a third modification;

Fig. 10 is a cross sectional view along the line 10—10 in Fig. 9; and

Fig. 11 is a cross sectional view along the line 11—11 of Fig. 9.

In the form of the invention as illustrated in Figs. 1 to 5 inclusive, a wheel hub 38 is connected in the usual manner with a main wheel portion 39. By suitable means such as roller bearings 40 and 41 a stub axle 42 is seated in the hub 38 and retained in position by means such as a nut 43. At its other end inside the wheel the stub axle is enlarged in the form of a first-like portion 44 in which a divided axle bolt 45, 46 is adapted to be fixed by suitable means such as clamping screws 47, 48. The respective extending ends 49, 50 of the axle bolt 45, 46 are spherically formed. These spherical ends are seated in corresponding spherical bearings 51, 52 in levers 53, 54. Adjustment of the bearings 51, 52 is preferably made by regulation of the caps 55, 56.

The opposite ends of the levers 53, 54 are respectively formed as trunnions 57 and 58 journaled in the housing 63 by bushings 59, 60 and 61, 62. A stub lever 64 is preferably attached to the upper trunnion 58 by suitable means such as the tightening screw 65 and is accordingly adapted to rotate with the said upper trunnion. The stub lever 64 actuates a shock absorbing piston (not shown) preferably mounted in the pipe 66. Motion of the trunnion 58 caused by movement of the wheel will accordingly move the stub lever 64 and therefore actuate the shock absorbing piston. The housing 63 can be attached to the frame portion 69 by any suitable means here illustrated as a flange 67 and screws 68.

In the form of the invention illustrated, the lower trunnion 57 is preferably made hollow. Its outer end is firmly connected against rotation with a torsion bar 70 extending substantially coaxial therein, and secured against displacement by suitable means such as a pin 71. The torsion spring 70 extends into a tube 83, preferably, forming a transverse stiffening frame member, to substantially the center thereof. At this point, in a preferred form of this invention, it is rigidly interconnected with a cylindrical intermediate member 73 freely movable within the tubular frame member 83. A plurality of additional torsion bars are also attached against rotation to the intermediate member 73, and, as illustrated in Fig. 5 preferably are positioned to surround the torsion bar 70. The other ends of the torsion bars 74 are attached to the frame against rotation by suitable means illustrated as a flange piece 75 which may be rigidly interconnected with the frame by the same means holding the housing 63 in place. The described construction has the advantage of a maximum utilization of space for the springing means, at the same time affording them protection from dirt and grease.

The arrangement described above accordingly results in a motion of the wheel parallel to the vehicle frame. Rigid motion of the wheel is insured by the manner in which the trunnions 57 and 58 are journaled. Upon departure of the wheel from its normal vertical position a twisting of the torsion bar 70 and 74 results and at the same time the shock absorber becomes effective through the stub lever 64. Steering of the wheel is permitted by the use of spherical ends 49 and 50 on the axle bolt 45, 46.

The torsion springs 70 and 74 may be replaced by the helical flexion spring 76 as illustrated in Figs. 6 and 7. This spring preferably possesses a rectangular section and may be cut out of a solid pipe. Hollow ends 78 and 79 form closed bushings from which the engaging claws 80 and 81 may be milled. Attention is directed to the fact however, that my invention in its broader sense is not intended to be limited to the specific form of helical spring illustrated. It will be obvious to those skilled in the art that other suitable forms may be utilized.

The flexion spring 76 is readily attached at one end to the trunnion 57 of the lower lever 53 by providing engaging notches therein. At its other end the claws 81 of the spring 76 engage an intermediate piece 82 preferably positioned in the center of the transverse member 83 and suitably held in the frame member against rotation. In the form of the invention illustrated relative rotation between the members 82 and 83 is brought about by tightening or crimping the frame member 83 in suitable notches provided in the intermediate member 82.

In the third form of my invention illustrated in Figs. 8 to 11 inclusive the wheel supports themselves may be identical with that illustrated in Figs. 1 to 7. Both sides of the vehicle are however, illustrated, the supporting construction comprising members 54', 57', 59', 60', 63', 66', and 71' being identical with the members 54, 57, 59, 60, 63, 66 and 71, previously shown. The spring arrangement however, in this form of the invention is slightly different. The torsion spring 70 for example, extends the width of the hollow frame member 83 and at its fixed end is attached to the opposite longitudinal frame member 69' by means of a flange piece 84'. The fixed end of the torsion bar 70 is formed with a plurality of notches which fit into corresponding notches in the flange member 84' to firmly hold this end of the torsion spring against relative rotation. The flange piece 84' may be rigidly interconnected with the frame by means of the same bolts by which the flange 67' of the housing 63' is attached. Similarly the torsion bar 70' is fixed to the frame through the notched end 88' seated in a flange piece 84 attached to the frame by the bolt 68.

In order that the bars 70 and 70' may pass one another, their points of attachment to the frame 85 and 85' lie eccentrically to the axis of the lever trunnions 57, 57', so that the point of passage of the bar 70' through the flange piece 84' lies adjacent the fixing point 85' of the bar 70' in the flange piece 84'. The bars 70 and 70' are respectively attached within trunnions 57 and 57' through appropriate notched ends and pins 87, 71 and 87', 71'.

If in this form of the invention the wheel is swung in its vertical plane a turning movement is transmitted to the torsion springs and the reaction will now act on the opposite longitudinal beam. The shock absorber connection and housing is exactly as in the previous examples. This form of the invention also introduces some bending stresses in the torsion bars due to their eccentric positioning, but the disadvantages of this are more than compensated by the additional length of torsion bar permissible.

This invention is not limited to the examples illustrated. Any suitable rotary spring means such for example, as torsion tubes can be used in place of the illustrated torsion bars. The particular mode of attachment between the ends of the torsion bars and their connected parts is not necessary, but instead, flanges or claws may be used. This invention also comprehends the use of a combination of types of torsion bars. For example, a central torsion bar may be utilized in combination with a surrounding helical flexion spring. Although the type of individual suspension illustrated above involves the use of link arms journaled transversely of the vehicle, my construction is also adapted for use in which the link axes are parallel to the vehicle so that the wheels will swing in transverse planes.

The use of the word "frame" throughout the specification and claims is not intended to be limited to a frame distinct from the body or coachwork of the vehicle, but as including a frame forming a part of, or integral with such body or coachwork.

It will be seen therefore, that I have provided a construction which satisfies the objects enumerated above and while I have shown the invention in its physical embodiments, it is to be understood that modifications of the construction shown may be made by those skilled in this art without departing from my invention as expressed in the following claims.

I claim:

1. In a vehicle having a frame including a pair of spaced apart longitudinally extending members, wheels for said vehicle, means for individually and independently supporting one of said wheels, comprising a pair of substantially longitudinally extending supporting members, means for pivotally connecting one end of each of said members to said wheel, torsional spring means, means for holding one end of said torsional spring means against rotation including means attached to one of said longitudinal frame members, means for journaling said torsional spring means near its other end to the other of said longitudinal frame members, means for attaching the journaled end of said torsional spring means to the other end of one of said supporting members, and means for journaling the other end of the second supporting member relatively to the frame.

2. In a vehicle having a frame including a longitudinally extending member, a wheel for said vehicle, means for supporting said wheel on said frame comprising a substantially vertical member on which the wheel is mounted, a pair of supporting levers forming a jointed link-motion device with said vertical member, guiding it for oscillation in a plane substantially parallel to said longitudinally extending frame member and having one end of each of said levers connected to opposite ends of said vertical member, trunnions formed at the other end of said levers, bearing means attached to said longitudinally extending frame member and extending outwardly of said vehicle at right angles to said longitudinally extending frame member, and a rotary spring having one end secured to one of said trunnions and its other end connected to the vehicle frame, whereby the wheel will be resiliently mounted relative to said frame.

3. The combination according to claim 2 in combination, with a housing for the rotary spring which also acts as a stiffening member for the frame.

4. The combination according to claim 2 in combination with a shock absorber operatively connected to the other of said shafts.

5. A wheel suspension particularly for motor cars, comprising a vertical member on which the wheel is mounted, a pair of supporting levers forming a jointed link-motion device with the member guiding it for oscillation and having one end of each of the levers connected to one end of the member, a trunnion formed at the other end of each of the levers, a spring secured to one of said trunnions, a shock absorber operatively connected to the other of said trunnions and bearing means for mounting said trunnions on a frame of the car, whereby the wheel will be elastically mounted relative to the frame.

6. The combination according to claim 2 in which one of the shafts is provided with an arm and in which a shock absorber is provided in a separate casing operable by said arm.

7. In a vehicle, in combination, a frame including a pair of longitudinally extending members, a hollow transverse frame member interconnecting said longitudinal members, a wheel supporting member, a link pivotally connected at one end to said wheel supporting member and having a hollow trunnion at its other end, bearing means on said frame for journaling said trunnion, and rotary spring means rigidly attached at one end to said trunnion within the hollow portion thereof and at its other end to said frame, for resiliently resisting motion of said wheel supporting member.

8. The combination according to claim 2 in which said rotary spring is in the form of an elongated spiral.

9. The combination according to claim 2 in which the trunnion is hollow and in which the rotary spring is attached to said trunnion within its hollow portion.

10. In a vehicle, a frame including a hollow tubular member, a wheel support, a lever pivotally connected at one end to said wheel support and at its other end to said frame, rotary spring means comprising at least two serially connected torsion bars positioned within said hollow frame member, means for rigidly attaching said spring means at one end to said frame, and means for attaching the other end of said spring means to said lever for movement therewith.

11. In a vehicle, a frame including a hollow tubular member positioned transversely of said vehicle, a wheel support, a lever pivotally connected at one end to said wheel support and at its other end to said frame, rotary spring means positioned within said hollow frame member, means for pivotally attaching said spring means at one end to said frame, and means for rigidly attaching the other end of said spring means to said lever against movement in all directions, the pivotal axis of said lever coinciding with the axis of said hollow frame member.

12. In a vehicle, a frame including a hollow tubular member, a wheel support, a lever pivotally connected at one end to said wheel support and at its other end to said frame, the pivotal axis of said lever coinciding with the axis of said hollow tubular frame member, rotary spring means positioned within said hollow frame member, means for rigidly attaching said spring at one end to said frame, and means for rigidly attaching the other end of said spring means to said lever for movement therewith, the axis of rotation of said spring means intersecting the pivotal axis of said lever at its point of connection with said lever.

13. In a vehicle, a frame including a hollow tubular member, a wheel support, a lever pivotally connected at one end to said wheel support and at its other end to said frame, rotary spring means positioned within said hollow frame member comprising two separate serially connected spring devices, one of said spring devices comprising a torsion bar and the second of said devices comprising a plurality of torsion bars effectively connected in parallel, means for rigidly attaching said spring means at one end to said frame, and means for attaching the other end of said spring means to said lever for movement therewith.

14. In a vehicle, a frame including a hollow tubular member, a wheel support, a first lever pivotally connected at one end to said wheel support and at the other end to said frame, rotary spring means positioned within said hollow frame member, means for rigidly attaching said spring means at one end to said frame, means for attaching the other end of said spring means to said first lever for movement therewith, the pivotal axis of said first lever coinciding with the axis of said hollow frame member, a second lever pivotally interconnecting said wheel support and said frame, and shock absorbing means mounted on said frame for actuation by said second lever.

15. In a vehicle, in combination, a frame, a wheel carrier, a pair of links pivotally connected at one end to said wheel carrier and having trunnions at their other ends, a closed housing having bearings adapted to support said trunnions and containing a shock absorbing device, a lever connected to one of said trunnions for actuation of said shock absorber device, means for attaching said housing to the vehicle frame, and spring means interconnecting the other trunnion and the frame for resisting the rotation of said other trunnion.

16. The combination according to claim 15 in which said frame includes a longitudinally extending beam to which said housing is attached.

17. The combination according to claim 15 in which said spring means comprises a rotary spring adapted to be twisted by the rotation of the last-mentioned trunnion.

FERDINAND PORSCHE.